United States Patent [19]
Faul

[11] Patent Number: 5,860,810
[45] Date of Patent: Jan. 19, 1999

[54] AUTOMATED INSTRUCTIONAL SYSTEM FOR PERFORMING MECHANICAL PROCEDURES

[75] Inventor: Maynard L. Faul, Scottsdale, Ariz.

[73] Assignee: McDonnell Douglas Helicopter Company, Mesa, Ariz.

[21] Appl. No.: 421,999

[22] Filed: Apr. 14, 1995

[51] Int. Cl.$^6$ .............................. G09B 19/00; G09B 7/00
[52] U.S. Cl. ............................................ 434/219; 434/323
[58] Field of Search ...................................... 434/219, 226, 434/234, 118, 72, 74, 75, 81, 82, 84, 85, 87, 88, 91, 92, 93, 94, 95, 307 R, 308, 323

[56] References Cited

U.S. PATENT DOCUMENTS

| | | |
|---|---|---|
| 4,316,720 | 2/1982 | Ackerman . |
| 4,675,675 | 6/1987 | Corwin et al. . |
| 4,713,815 | 12/1987 | Bryan et al. . |
| 4,739,488 | 4/1988 | Asakura . |
| 4,773,011 | 9/1988 | VanHoose . |
| 4,782,506 | 11/1988 | Sevcik . |
| 4,851,999 | 7/1989 | Moriyama . |
| 4,972,322 | 11/1990 | Asakura et al. . |
| 5,305,244 | 4/1994 | Newman et al. ..................... 364/708.1 |
| 5,546,502 | 8/1996 | Hart et al. ................................. 395/12 |

*Primary Examiner*—Richard J. Apley
*Assistant Examiner*—John Edmond Rovnak
*Attorney, Agent, or Firm*—Bell Seltzer Intellectual Property Law Group of Alston & Bird LLP

[57] ABSTRACT

A mechanical procedure is performed using a sequence of instructions generated from a relational data base. The data base includes at least one unit operation file containing data associated with the performance of a single unit operation, indications of prior operations that must be performed, and any support files that are required by each unit operation file. There is a generic instruction file containing a plurality of generic instructions. A sequence of unit operations to perform the mechanical procedure is first defined, using the information in the unit operation files. After this arranging of the unit operations, a series of task-specific instructions is generated for each of the unit operations by selecting and completing a series of generic instructions using information in each pertinent unit operation file.

15 Claims, 3 Drawing Sheets

REMOVE 1 CONNECTOR, ITEM 1
USE SPECIAL TOOL 76.
CAUTION: DO NOT TWIST
         CONNECTOR
WHEN COMPLETE, PRESS [RETURN]

| PART NUMBER | NOMENCLATURE | ITEM NO. | QTY | PRIOR TASK | USED AGAIN | F-L REL. | INSPECTION REQD |
|---|---|---|---|---|---|---|---|
| 12345 | WIDGET | 5 | 1 | 5678 | NO | | J |
| J103 | CONNECTOR | 1 | 1 | 1234 | YES | X | |
| NAS678 | NUT | 2 | 4 | | NO | X | |
| AN910 | WASHER | 3 | 4 | | YES | X | |
| NAS1112 | BOLT | 4 | 4 | | YES | | |

| SPECIAL CAUTION/ WARNING G/S NO. | TOOLS | CLEANING G/S CONS. | TORQUE G/S VAL. | TASK TIME | GENERIC STEP CODE | |
|---|---|---|---|---|---|---|
| | | | | | REMOVAL | INSTALLATION |
| AA | | L | 1 | | .2 | E | F |
| BB | | | | | .1 | D | K |
| | 76 | | 0 | 20 in/lb | .1 | A | I |
| M | | | | | .1 | B | H |
| | | | | | .1 | C | G |

REMOVE 1 CONNECTOR, ITEM 1
USE SPECIAL TOOL 76.
CAUTION: DO NOT TWIST
CONNECTOR
WHEN COMPLETE, PRESS [RETURN]

AUTOMATED INSTRUCTIONAL SYSTEM FOR PERFORMING MECHANICAL PROCEDURES

BACKGROUND OF THE INVENTION

This invention relates to the performing of complex mechanical procedures, and, more particularly, to an approach for guiding a person or machine through those procedures.

Many modern systems are highly complex, both to construct and to repair. Manufacturers usually provide a maintenance manual for the systems, for the use of repair and maintenance personnel in the field. These maintenance manuals are highly comprehensive and include detailed, step-by-step procedures required to keep the system in normal operation through preventive maintenance and repair of failed portions of the system. For example, a typical military helicopter may have a maintenance manual that runs to over 50 volumes, has nearly 9,000 pages, and occupies over 15 feet of shelf space. Such masses of paper cannot be readily transported to many field sites where maintenance may be required.

The preparation of a maintenance manual of this size and complexity is itself a major undertaking. Updating the maintenance manual responsive to model revisions, new requirements, improved procedures, new capabilities and equipment add-ons, and the like is also highly time consuming. Once the manual is revised, the revisions must be made available to all field users.

The use of the maintenance manual is not simple in many cases. For most procedures, there are cross references to other sections of the manual, as well as to various supporting documents. As an example, if it is known that a particular piece of apparatus has failed, the mechanic does not simply open the manual to the section dealing with that apparatus and begin working. There are usually lists of preliminary tasks to be performed, such as taking necessary safety precautions, rendering the apparatus safe to work on, disassembling structure to reach the particular apparatus of interest, obtaining special parts or tools, obtaining consumables to be used in the procedure, etc. Upon reaching a particular step in the procedure, the mechanic may be referred to a supporting document for the instruction or information to perform some multistep action. After that referenced action is performed, the mechanic returns to the basic document and continues.

The most efficient way to present this information in a manual is with extensive cross referencing to other standard procedures, rather than placing every step of every procedure into one place. It has been estimated that a 9,000 page maintenance manual would grow to over 100,000 pages if every step of every procedure were written in order, without cross referencing. This amount of paper would be unacceptably large.

When confronted with this mass of information, it is possible for even the best mechanics to make mistakes or be inefficient. Typical mistakes include failing to take required safety precautions, turning to the wrong cross-referenced sections and beginning the wrong procedure, skipping entire procedures, skipping vital steps of the proper procedure, being confused by inconsistent wording in different procedures, and using the wrong parts, tools, or consumables. Typical inefficiencies include interrupting a procedure to locate a tool or consumable that was previously overlooked, starting over or retracing steps, having to sort through information that may be present in the manual but may not be needed for a particular procedure, and taking the time to complete necessary maintenance logs. These problems are of even more concern when the maintenance is performed in adverse conditions or by relatively inexperienced mechanics.

To overcome some of the problems inherent in the traditional approach to providing maintenance information, "paperless" maintenance systems have been developed. In such an approach, the entire maintenance manual is stored on a laser disk or other electronic medium that is used with a portable computer. The entire maintenance library thus weighs only a few pounds and can be readily transported. With good indexing, the mechanic can rapidly find a particular procedure to be performed and its related procedures as they are needed.

The existing paperless maintenance instruction systems still suffer from important shortcomings. They require the same time to write and prepare as traditional paper manuals. Updating with changes in procedures or models is slow and expensive. The mechanic can still make the same types of mistakes and have the same inefficiencies as discussed above.

There is a need for an improved approach to performing detailed mechanical tasks such as the maintenance of complex systems. Such an approach must permit the mechanic to work in an efficient, error-free manner, while reducing the cost and time required for writing and updating the manual. The present invention fulfills this need, and further provides related advantages.

SUMMARY OF THE INVENTION

The present invention provides a new approach to providing step-by-step instructions for performing complex mechanical procedures such as maintenance procedures. The mechanic is given a sequence of instructions to be performed one-at-a-time. The instructions pertain only to the procedure that is to be performed and do not contain unrelated information that can be confusing. The mechanic does not have to make cross references to various procedures—it is only necessary to follow the instructions as they are presented and make appropriate responses. Diagrams and other visual assistance are available as needed. The writing of the maintenance procedures and their updating are more easily and quickly performed than with prior approaches. The technique is implemented with a computer and memory, so that its size and weight are small.

In accordance with the invention, a method for performing a mechanical procedure comprises providing a relational data base that includes at least one unit operation file containing data associated with the performance of a single unit operation, an indication of any prior unit operation that must be performed, and an indication of any subsequent unit operation to be performed. There are typically a plurality of such unit operation files, and there is also optionally provided at least one support file containing data referenced by the unit operation files. There is also a generic instruction file containing a plurality of generic instructions.

In implementing the approach, a sequence of unit operations that must be performed to complete the mechanical procedure is automatically arranged in order using the information in the unit operation files. A series of instructions is generated for performing the mechanical procedure according to the results of the step of ordering. In this development of instructions, a series of task-specific instructions is created for each of the unit operations by selecting and completing a series of generic instructions using information in the unit operation file.

The series of task-specific instructions of standard format is displayed for the mechanic in order, so that the mechanic can take action in that order. By providing internal cross references between various unit operation files, either sequentially or for parallel operations, the entire task from start to finish is displayed in a seamless manner so that the mechanic has no conception of working back and forth between different procedures as in prior approaches. The instructions can require responses, so that no further instructions are displayed until the correct response is input by the mechanic. By using the instruction sequence and required responses, a maintenance log entry is built automatically, so that the mechanic is not required to keep notes of procedures for later transcription into a log. This technique simplifies the work of the mechanic and reduces the chances of error or inefficiency.

The present approach also reduces the time required to write a maintenance manual, and the time required to update the manual and provide the updated information to field units. The writer of the manual is not required to prepare extensive prose instructions, but instead works by modifying the standard instructions of the generic instruction file. To provide the information required to complete these generic instructions and form task-specific instructions, the writer inserts logical information and specific data or information into the unit operation file for an operation. To change the instruction, it is necessary only to change the appropriate entry in the unit operation file or support file, not to change and check any prose.

This latter point is simply stated, but it has enormous practical significance. If, for example, a solvent consumable is replaced with a substitute, it is necessary only to replace the existing named solvent with the substitute in a consumables support file. The change can be made readily with a read-in to the support file. From then on, the mechanic will always be instructed on the display screen to use the substitute, by name. The screen can be made to flash or otherwise highlight the change for a period of time, to draw the mechanic's attention to the change. It will not be necessary for the mechanic to be made aware of change notices which in fact may never affect the mechanic's work if the change involves a solvent used in a procedure that the mechanic is never called upon to perform.

The present invention provides an important advance in performing mechanical procedures such as maintenance of complex systems. Instruction procedures are readily prepared and updated by the writer, and are more readily followed and understood by the user, than in prior approaches. Both the writer and the user/reader of the procedures are able to concentrate on the procedure itself, rather than the writing and reading of prose statements to describe the procedure. The nonuniformities inherently present when several writers are involved in writing a complex procedure, due to their different writing styles and approaches, are avoided, because of the standardization of the writing style. The potential for the introduction of ambiguities into the instructions is minimized, an important consideration for complex, possibly dangerous, procedures. The writer is able to perform the writing with a combination of keyboard and mouse-implemented operations—a "point-and-shoot" authoring technique—that is performed much faster than conventional prose writing. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

The present invention is preferably embodied in a method and apparatus useful in performing a mechanical procedure such as a maintenance procedure. More specifically, the approach of the invention is useful in providing step-by-step instructions for a person performing the procedure. These instructions can be, and preferably are, used in both training and actual field activities. The following discussion presents the preferred approach for practicing the invention, with examples of its use. The invention is intended to be highly flexible in its application. Accordingly, the examples of its utilization presented herein are drawn from the inventor's preferred uses. They are presented as illustrative rather than limiting or exclusive.

Figure 1:
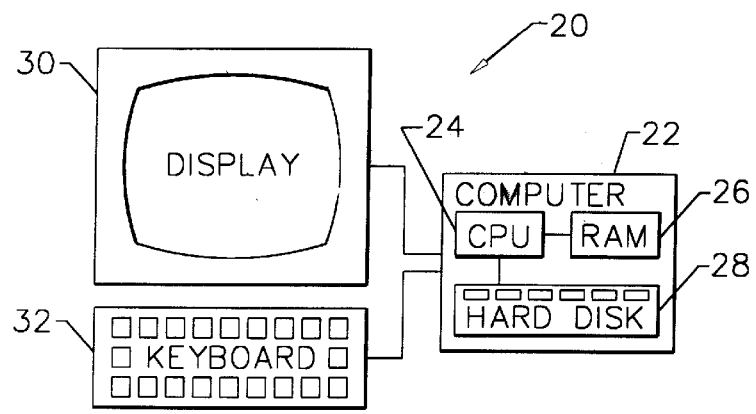
FIG. 1 is a schematic diagram of the physical elements of the present invention.

FIG. 1 depicts an apparatus 20 used with the present approach. The apparatus 20 includes a computer 22 having a central processing unit (CPU) 24, random access memory (RAM) 26, and an accessible mass storage device, here shown as a hard disk 28. Optionally, the computer 22 can include other electronic input/output devices such as floppy disk drives or modems, and other types of mass storage devices such as optical disk drives. The apparatus 20 also includes a display 30 used to provide instructions to a human user of the apparatus 20, and a keyboard 32 through which the user can communicate to the computer. The apparatus 20 is preferably provided as a computer system such as a minicomputer. Such computer systems are well known in the art for other uses, as is the approach for interrelation and intercommunication of the elements.

Figure 2:
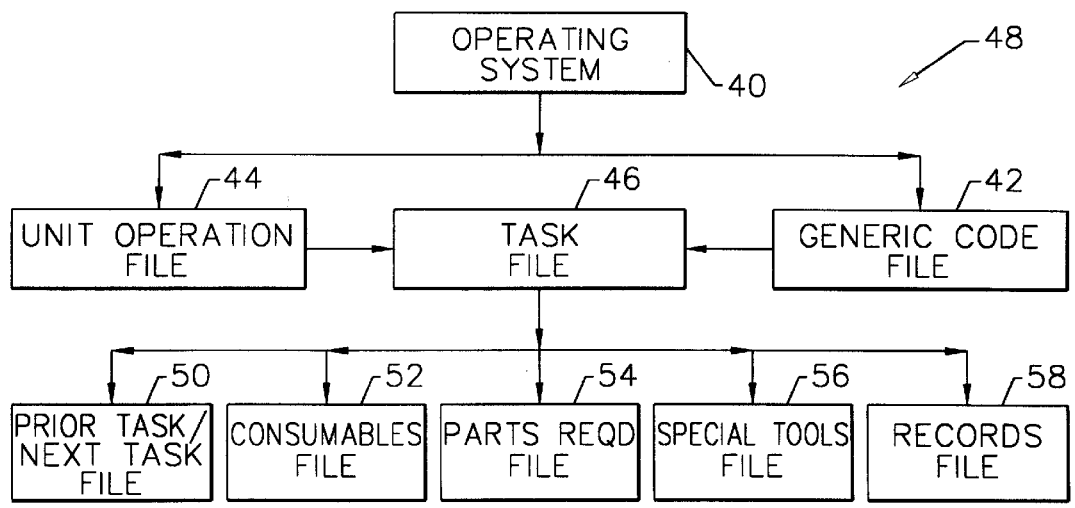
FIG. 2 is a block diagram of an example of the interrelation of the files used to implement the present approach.

Information and operating instructions specific to the present approach are stored in the RAM 26 and the hard disk 28. FIG. 2 depicts the types of information that are stored, and their general interrelation. An operating system 40, which is normally resident in the RAM 26, coordinates the other information and program functions in the manner to be described subsequently.

Under control of the operating system 40, instructions are generated that are specific to a particular task to be performed. As used herein, an "instruction" is a statement presented to the human user to be considered or acted upon, such as a statement of what is to be done next, a warning, a cautionary statement, general information, or the like. An "instruction" is, in general, formed of two parts according to the present approach. There is a generic statement, such as "install", "remove", "clean", "obtain", "be aware of", or the like. Such statements are applicable to a large number of situations. There can also be a specific limiting portion of the instruction, which is applicable to a particular situation. Thus, in one case, "install" might be followed by "a bolt" and/or the item specification of the bolt. In another case, "clean" might be followed by "a connector" and/or the item specification of the connector.

Generic statements are, in the present approach, stored in a generic code file 42. Identification of the generic code statement to be used and specific limiting portions of the instruction are stored in a unit operation file 44. There are typically many unit operation files in the system, one for each identifiable task or "unit" of work. When processed through the CPU 24, the operating system 40 uses information in the unit operation file 44 to select a next generic statement from the generic code file 42 for display. That generic statement is completed with information from the unit operation file 44 that is specific to the next instruction. The result is a task-specific instruction that is stored in a task file 46 for transmission to the display 30.

In many instances, it is necessary to make reference to some other file in order to complete the instruction. These other files are termed support files 48. Five types of commonly used support files 48 are shown in FIG. 2, but there could be additional support files as needed. A prior task/next task file 50 includes a listing of other unit operations files that are available. As is stated in the unit operations file 44 for a specific task, it may be necessary to perform some other unit operation task prior to, or after, the performance of a particular instruction. The prior task/next task file 50 gives the specific location of the unit operations file for such tasks, thereby linking the prior, current, and next tasks to be performed.

A consumables file 52 lists items that are consumed during the course of performing an instruction. Consumables can include, for example, cleaning agents, solvents, acids, rinses, lubricants, and the like. A parts required file 54 and a special tools file 56 list, respectively, parts that must be used in performing an instruction and special tools that must be used in performing an instruction. A records file 58 provides a listing of records that must be kept in performing an instruction, and a place for storing the record information for later compilation of a report on the mechanical procedure.

In order to understand the functioning of the system in relation to these elements, it is helpful to follow through an example for a typical unit operation. The following Table I lists examples of generic statements such as would be stored in the generic code file 42.

TABLE I

| ID | Statement |
| --- | --- |
| A | Remove (qty) nut(s), item no.____. |
| B | Remove (qty) washer(s), item no.____. |
| C | Remove (qty) bolt(s), item no.____. |
| D | Remove (qty) connector(s), item no.____. |
| E | Remove (nomenclature). |
| F | Install (nomenclature). |
| G | Install (qty) bolt(s), item no.____. |
| H | Install (qty) washer(s), item no.____. |
| I | Install (qty) nut(s), item no.____. |
| J | Inspect (nomenclature). |
| K | Install (qty) connector(s), item no.____. |
| L | Clean mounting area with (consumable). |
| M | Use special tool (tool name or number). |
| N | Clean (nomenclature) with (consumable). |
| O | Torque (nomenclature) to (value). |
| AA | Get help for lifting or carrying objects weighing more than 95 pounds. |
| BB | Do not twist connector. |
| KK | Voltages may cause arcing. Remove rings, watches, and other jewelry which may cause a shock/burn hazard. |

These statements of Table I are generic in the sense that they may be used more than once in relation to a particular generic operations file, as for example where more than one set of nuts, bolts, and washers is to be removed and later reinstalled. They may also be used in relation to different unit operations files.

Figure 3:
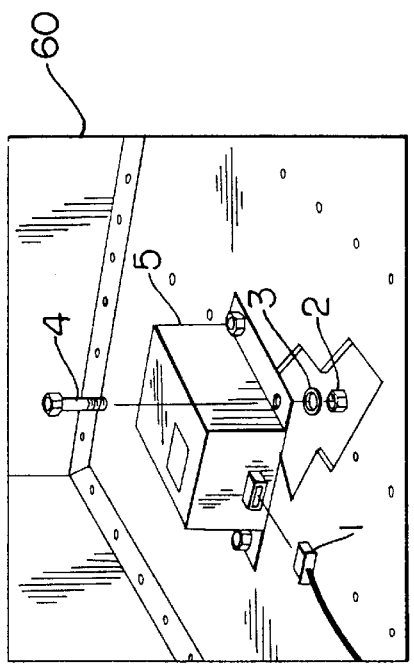
FIG. 3 is a schematic depiction of an illustrative example of the preferred content of a unit operation file.

FIG. 3 illustrates an example of the content of a unit operation file 44. This file is here depicted in a manner that is convenient for discussion purposes, but in practice is an electronically stored file. Techniques for storing the various types of information discussed next in electronic form are well known. The example chosen relates to the removal and replacement of a widget, shown as item 5 in the graphic representation of FIG. 3. The unit operation file 44 contains a graphic representation of the widget and its associated structure, shown as a graphic inset 60 that is ordinarily stored in digital form in a drawing support file. The graphic inset 60 could also be stored as a drawing support file on a laser disk or other storage medium, either in a still form or as a moving or stop-action form comparable with a motion picture of the widget being removed and installed.

The graphic inset 60 is task specific. That is, it contains only the information required to perform the task covered by the particular unit operation file. This itself is an important advance. Most paper manuals contain complex drawings with much more information than required to perform a specific task, because the drawings are used in conjunction with multiple tasks. To prepare a drawing specific to each task would produce an overwhelming paper burden in the manual. Since the paper drawings contain more than necessary for a particular task, they may be confusing. Here, a drawing support file may contain much more information that required for any one task, but only that information required for the specific task is used in preparing the drawing inset 60.

The unit operation file 44 also contains other information necessary to construct instructions and provide assistance to the mechanic/user. A part number and nomenclature for each item which must be referenced are shown, see the first and second columns of the tabular portion of FIG. 3. These parts are associated with an item number, third column, which corresponds to a item callout in the graphic inset 60. In this case, the item callout is also the order in which the item is manipulated in the specific procedure covered by the unit operation 44. A quantity indication, fourth column, indicates how many of the item are found in the particular procedure.

A "prior task" indication, fifth column, is used to indicate what other unit operation file must be executed prior to executing the particular instruction. In the present example, the widget to be replaced by the unit operation file 44 might be located behind an access panel that must be removed using a very specific procedure. Thus, the task of removing the connector 1 must be preceded by the execution of the prior unit operation file dealing with removal of the access panel, indicated as file 1234 in the fifth column of FIG. 3.

When the mechanic first calls for assistance in replacing the widget, the operating system 40 identifies all prior tasks that must be performed from the "Prior Task" file and locates the corresponding unit operation file for each prior task from the prior task/next task file 50. The unit operations are ordered in the sequence in which they must be performed. When the instruction sequence is executed, the entire unit operation file for the removal of the access panel, with its graphics, will be presented prior to presentation of the unit operation file for widget replacement. The execution of other unit operation files (e.g., a specialized cleaning procedure) can be inserted or nested within the execution of the unit operation file 44 for widget replacement.

These steps are performed in the indicated sequence provided in the "Prior Task" column, and the computer keeps track of the mechanic's place in the overall process and keeps track of all required records. The problem associated with page-oriented instruction procedures, wherein the mechanic can become confused or leave out steps or procedures as the result of flipping back and forth between procedures, is avoided entirely. The entire instruction process is "seamless", in the sense that the mechanic does not know (nor care) which particular unit operation file is being executed. The mechanic only is aware, after requesting instruction on replacing the widget, of being led through the entire process, from the initial ordering of special tools to the final disposing of consumables, in an orderly, step-by-step process.

The mechanic is also aware that the instructions are presented in an orderly, uniform format, without the presence of a large amount of extraneous matter. Most paper manuals covering the widget would include much more information than required simply to remove and replace the widget. The mechanic must sort through the extraneous information to find out the procedure for removing and replacing the widget. Here, only the information specific to the task at hand is presented. Additionally, the instructions are presented in a uniform format. Since different parts of paper technical manuals are typically written by different persons, the style and usage of terminology can vary significantly. The present approach is built upon the use of the standard, generic instructions which will always be used with a precise meaning.

The sixth column in FIG. 3 indicates whether an item is to be used again. This information is keyed to the parts required file 54, so that new parts can be ordered as necessary, before the process is to start.

The seventh column, the flow line relation, indicates steps that are logically combined and/or are performed in parallel. For example, a competent mechanic can, in some instances, be told simply to remove the nut and washer from a bolt, and to remove the bolt from the assembly, rather than being led through these steps one at a time. Thus, the flow line relation permits logically related steps to be chained together into a master step which covers the three individual steps.

The eighth column, inspection required, contains a statement that is keyed to the generic code file and which can be used to illustrate the formation of a task-specific instruction. Here, it is assumed that the old widget is to be inspected after its removal. Letter "J" is keyed to the generic statements in Table I, above. Generic statement J, "Inspect (nomenclature)", is completed by the operating system 40 with the respective item nomenclature from the second column, here "Widget", to produce a task-specific instruction "Inspect Widget" that is placed into the task file 46 and displayed to the mechanic. It will be appreciated that, for the present illustrative example, the generic instructions have been kept brief. In practice, the instructions could be made much more complex and descriptive, and there could be a cross-reference to another unit operation file dealing with the inspection. This inspection unit operation file would be inserted seamlessly into the widget replacement unit operation file being executed, to provide further instruction as needed.

The ninth column, Special Tools, indicates the use of special tools used to accomplish a particular step. Again referring to Table I, instruction M, "Use removal tool (tool name or number)", is completed with tool number 76 in this case, to provide the task-specific instruction "Use removal tool no. 76", which is keyed to the special tools file 56. This instruction is displayed for the mechanic.

The tenth column indicates cautioning or warning statements that are to be displayed during a particular step. These statements are found in Table I for this example.

The eleventh, twelfth, fourteenth, and fifteenth columns set forth instructions that are constructed by combining generic codes with task-specific information in the manner indicated previously. The corresponding generic codes are found in Table I.

The thirteenth column sets forth information that may not be of concern to the mechanic, and which may or may not be presented to the mechanic. In this case, that information is a standard time required for each step. That is, a standardized time for removing the four nuts may require 0.1 hours, or 6 minutes. Removing the four washers may require 0.1 hours, or 6 minutes, and removing the four bolts may require 0.1 hours, or 6 minutes. This information would have been developed from prior experience with these tasks, and can be used in several ways. It can be used to plan the time required to perform the entire operation, and thereby schedule personnel and equipment. It can also be used to evaluate personnel performance.

Figure 4:
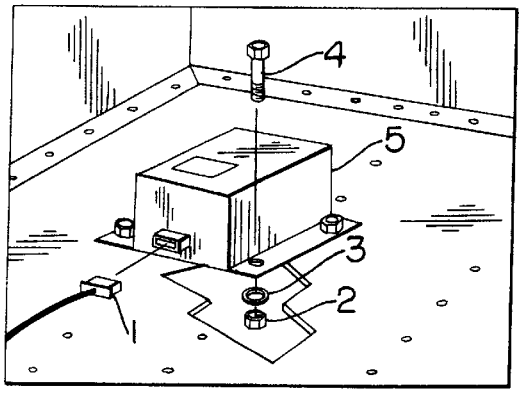
FIG. 4 is a schematic depiction of an example of the display screen during an operation.

FIG. 4 is an example of the screen of the display 30 as viewed by the mechanic during one of the steps, the mechanical procedure associated with the removal of the connector 1 of FIG. 3. The information associated with this step can be found by tracing across the line associated with the connector in FIG. 3, and comparing that information with the instructions displayed in FIG. 4. First, a prior task 1234, taken as the removal of the access panel, would have been completed. The graphic inset 60 is presented. The same graphic could be retained for several steps, or the graphic could be changed as each step is performed, particularly when the visual appearance of the work area is expected to change when large components are removed. The task-specific text instructions are formed by presenting and completing (as necessary) generic instructions D for the removal, M for the tool to be used, and BB for a cautioning statement. The next instruction will not be presented until the mechanic presses "Return" to signify that the displayed step is complete. A capability to review, at any time, previously performed steps with a keyboard input can also be provided.

As noted, the instructions can be made more complex and interactive, as may be necessary. For example, during the later installation step, the installation instruction for the widget could read "Install new widget and type in widget serial number here: (blank)". The next step would not be displayed until the mechanic had actually typed in the serial number of the newly installed widget in the proper form for that serial number. The mechanic could not forget to do so, possibly necessitating later disassembly to determine the part serial number. The entered serial number would be provided to the records file 58 for entry into a report of the replacement operation and thence into the maintenance log of the system. The reporting would be accomplished automatically at the completion of the procedure, without further action by the mechanic. The report could be printed, or transmitted electronically using a modem or a floppy disk, for example.

Figure 5:
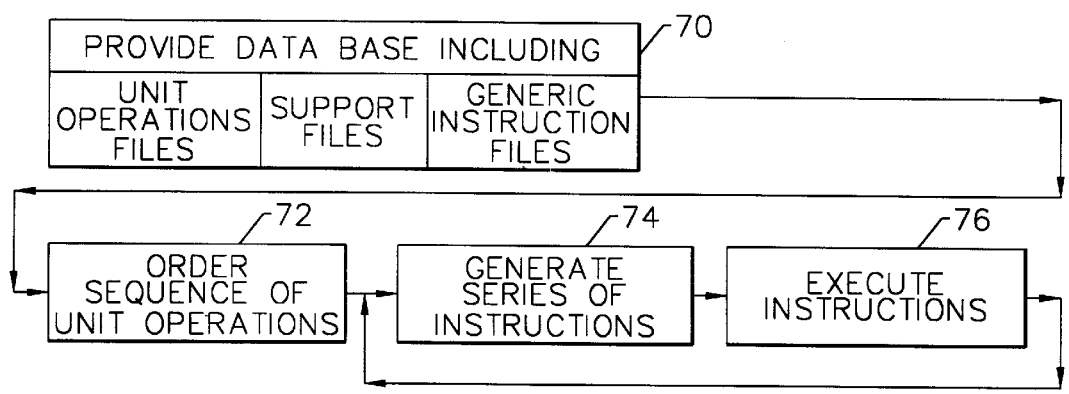
FIG. 5 is a block flow diagram of a preferred implementation of the present approach.

FIG. 5 is a block flow diagram of the approach of the invention. The data base is provided, numeral 70. The data base includes the unit operation files 44, the generic code files 42, and the support files 48. This step typically includes writing these various files according to the approach described previously and loading them into the computer 22. Upon execution of the operation system 40, a sequence of unit operations is placed into the proper order, numeral 72. Once the overall operations are identified and ordered, there begins an iterative process of generating instructions, numeral 74, and executing instructions, numeral 76. As each instruction is executed, another is generated for subsequent execution.

The present approach thus provides an architecture for writing, presenting, and processing instructions for mechanical procedures. Some of its advantages have been discussed above, but there are important additional benefits. The writing of instruction procedures is greatly simplified, made faster, and made more efficient by the present approach. The writer or author is not required to develop extensive prose discussions, or to provide information not useful for particular tasks. When complex paper manuals are written, the author must first determine what to say, and then find a way to say it. The author can become confused in analyzing and writing about complex procedures. If a mistake is made, correction of the incorrect prose is often more time consuming that the initial writing. In the present approach, the author must of course determine the steps required, but the writing process is largely a matter of filling in the table of FIG. 3, with cross reference to the list of generic codes, Table I. If a mistake is made and the order of steps must be changed, for example, it is necessary only to change the indicator in the table as to the order of steps. It has been estimated that the writing of a typical maintenance procedure that has previously required 40 hours can be reduced to less than ten hours using the approach of the invention.

Similarly, the updating of the procedures and the preparation of procedures for new models is greatly simplified. For example, if a particular consumable solvent currently being used is determined to be environmentally unacceptable and must be replaced by a different solvent, it is necessary only to change the solvent type in the table of the consumables file 54 and to provide that change to all field units by modem or on a floppy disk. At all places where the particular solvent had been previously used, the name of the new solvent will appear. Where a change is made, a "heads up" indication can be provided to the display, calling the attention of the mechanic to the change.

The present approach can also be used as part of an integrated maintenance program in conjunction with other automated procedures. For example, if several helicopters return from a mission with various maintenance problems indicated in on-board diagnostic systems, this information can be transferred to the present instruction apparatus. By effectively simulating the repair requirements, the time, tools, and consumables required to repair the problems can be quickly and accurately determined. The requirements can be compared with automated logistics records of available materiel and personnel, and the most effective repair strategy for the entire group of helicopters determined. Although such estimations are already regularly done, the present approach integrates the planning process with the actual, up-to-date maintenance procedures so that there cannot be mistakes due to a failure to recall particular requirements, for example.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for performing a mechanical procedure, comprising the steps of:

providing a computer system that includes a relational data base, the data base comprising at least one unit operation file containing data associated with the performance of a single unit operation including data identifying one or more specific parts and references to generic instructions and a pointer to any prior unit operation and an indication of any subsequent unit operation that must be completed to perform the mechanical procedure, and a generic instruction file containing a plurality of generic instructions;

arranging a sequence of unit operations that must be performed to complete the mechanical procedure based upon the pointers provided by the at least one unit operation file as to any prior unit operations and any subsequent unit operations; and generating a series of instructions for performing the mechanical procedure in the sequence of unit operations established by said arranging step, the step of generating including a step of creating a series of task-specific instructions for each of the unit operations by integrating the data provided by each unit operation file including the data relating to one or more specific parts with generic instructions from the generic instruction file.

2. The method of claim 1, wherein the step of providing a computer system including a relational data base includes the step of providing a computer system that includes at least one support file containing data referenced by the at least one unit operation file, and wherein the step of creating a series of task-specific instructions includes the step of integrating data from the at least one support file to complete the generic instruction.

3. The method of claim 1, wherein the step of providing a computer system that includes a relational data base includes the step of providing a computer system that includes a generic instruction file containing at least one generic instruction selected from the group consisting of a caution instruction, a warning instruction, an obtain special tool instruction, a remove instruction, an install instruction, a clean instruction, a reuse instruction, a discard instruction, and an inspect instruction.

4. The method of claim 1, wherein the step of providing a computer system that includes a relational data base includes the step of providing a computer system that includes a representation of a visual image of an article in the unit operation file that is to be displayed during the unit operation.

5. The method of claim 1, wherein the step of providing a computer system that includes a relational data base includes the step of providing a computer system that includes a unit operation file that has at least one data element selected from the group consisting of identifications of at least two parts, a sequence number for each part, and a generic instruction code reference for each part.

6. The method of claim 1, wherein the step of generating a series of instructions includes the step of generating at least one instruction requiring a response by an entity performing the mechanical procedure.

7. The method of claim 1, including the additional step, after the step of generating, of performing the series of instructions produced in the step of generating.

8. The method of claim 7, wherein the step of generating a series of instructions includes the steps of generating at least one instruction requiring a response by an entity performing the mechanical procedure; and halting generation of additional instructions until a response is received.

9. The method of claim 7, including the additional step, after the step of performing the series of instructions, of automatically preparing a record of the procedure performed by the entity.

10. The method of claim 2 wherein the step of providing a computer system that includes at least one support file includes the step of providing at least one support file which includes a consumables listing.

11. The method of claim 2 wherein the step of providing a computer system that includes at least one support file includes the step of providing at least one support file which includes a parts required listing.

12. The method of claim 2 wherein the step of providing a computer system that includes at lest one support file includes the step of providing at least one support file which includes a special tools listing.

13. The method of claim 2 wherein the step of providing a computer system that includes at least one support file includes the step of providing at least one support file which includes a records output listing.

14. A method for performing a mechanical procedure comprised of at least one unit operation, the method comprising the steps of:

providing a plurality of generic instructions;

providing a computer system that includes a data base comprising a unit operation file containing data associated with the performance of a single unit operation including data identifying one or more specific parts and references to the generic instructions; and automatically generating a series of task-specific instructions for performing the unit operation by selecting and completing a series of generic instructions based upon the data provided by the data base including data identifying one or more specific parts.

15. Apparatus for providing instructions during the performance of a mechanical procedure, comprising:

a display screen;

a memory containing a relational data base, the data base comprising
at least one unit operation file containing data associated with the performance of a single unit operation including data identifying one or more specific parts and references to generic instructions and a pointer to any prior unit operation that must be completed to perform the mechanical procedure, and
a generic instruction file containing a plurality of generic instructions;

means for arranging a sequence of unit operations that must be performed to complete the mechanical procedure based upon the pointers provided by the at least one unit operation file as to any prior unit operations that must be completed to perform the mechanical procedure;

means, responsive to said arranging means, for generating a series of instructions for performing the mechanical procedure in the sequence of unit operations established by said arranging means, the means for generating including means for creating a series of task-specific instructions for each of the unit operations by integrating the data provided by each unit operation file including the data relating to one or more specific parts with generic instructions from the generic instruction file; and means for sequentially displaying the series of task-specific instructions on the display screen.

* * * * *